US012557822B2

(12) United States Patent
Koerwitz et al.

(10) Patent No.: US 12,557,822 B2
(45) Date of Patent: Feb. 24, 2026

(54) AUTOMATED CLEAN IN PROCESS (CIP) SYSTEM

(71) Applicant: CMS TECHNOLOGY, LLC, Chicago, IL (US)

(72) Inventors: Jordan Koerwitz, Chicago, IL (US); Daniel Marken, Chicago, IL (US); Douglas Kroitsch, Chicago, IL (US); Mark Bramlett, Chicago, IL (US); Drew Dalton, Chicago, IL (US)

(73) Assignee: CMS TECHNOLOGY, LLC, Chicago, IL (US)

( * ) Notice: Subject to any disclaimer, the term of this patent is extended or adjusted under 35 U.S.C. 154(b) by 0 days.

(21) Appl. No.: 18/675,304

(22) Filed: May 28, 2024

(65) Prior Publication Data

US 2024/0315288 A1 Sep. 26, 2024

Related U.S. Application Data

(62) Division of application No. 17/930,999, filed on Sep. 9, 2022, now Pat. No. 12,022,852.

(60) Provisional application No. 63/242,575, filed on Sep. 10, 2021.

(51) Int. Cl.
*A23B 2/792* (2025.01)
*A23B 2/00* (2025.01)
*B08B 3/08* (2006.01)

(52) U.S. Cl.
CPC .............. *A23B 2/792* (2025.01); *A23B 2/001* (2025.01); *A23B 2/003* (2025.01); *B08B 3/08* (2013.01); *A23V 2002/00* (2013.01)

(58) Field of Classification Search
CPC ........... A22C 18/00; A23B 2/00; A23B 2/001; A23B 2/003; A23B 2/70; A23B 2/725; A23B 2/729; A23B 2/742; A23B 2/75; A23B 2/788; A23B 2/792; A23B 4/00; A23B 4/14; A23B 4/18; A23B 4/20; A23B 4/24; A23B 4/26; A23B 7/00; A23B 7/14; A23B 7/153; A23B 7/154; A23B 7/157; A23B 7/158; B08B 3/00; B08B 3/04; B08B 3/08; B08B 9/00; B08B 9/02–0325
See application file for complete search history.

(56) References Cited

U.S. PATENT DOCUMENTS

| | | | |
|---|---|---|---|
| 5,888,311 A | 3/1999 | Laufenberg et al. | |
| 2009/0208616 A1 | 8/2009 | Perkins | |
| 2011/0097460 A1 | 4/2011 | Bullard et al. | |
| 2018/0279635 A1 | 10/2018 | Walsh et al. | |

(Continued)

OTHER PUBLICATIONS

International Search Report and Written Opinion of the International Searching Authority mailed on Dec. 2, 2022. issued on the corresponding International Application No. PCT/US2022/076226, filed on Sep. 9, 2022, 15 pages.

(Continued)

*Primary Examiner* — Natasha E Young
(74) *Attorney, Agent, or Firm* — CHRISTENSEN O'CONNOR JOHNSON KINDNESS PLLC

(57) ABSTRACT

Provided are foodstuff treatment systems that are convertible between a processing mode in which foodstuffs are processed (e.g., disinfected) and a clean-in-place mode in which the system operates to clean material (e.g., biological buildup) that has accumulated within the system.

19 Claims, 12 Drawing Sheets

(56) References Cited

U.S. PATENT DOCUMENTS

| | | | |
|---|---|---|---|
| 2021/0197240 A1* | 7/2021 | Hinck | A61L 2/22 |
| 2021/0205766 A1 | 7/2021 | Bullard et al. | |

OTHER PUBLICATIONS

EPO Communication pursuant to Article 94(3) EPC mailed on Oct. 15, 2025, issued in European Application No. 22 797 200.7; 7 pages.

\* cited by examiner

*DAILY FRESH WATER USAGE TOTAL (PRE-ARC:*
*54,600 GALLONS/DAY*

*DAILY WATER USAGE (POST-ARC:*
*30,400 GALLONS/DAY*

*FRESH WATER SAVINGS TOTALLING:*
*6 MILLION GALLONS/YEAR*
*20% WATER REDUCTION TO D3S*

*CHEMICAL REDCTIONS:*
*10+% REDUCTION IN TOTAL PAA*
*CONSUMPTION*

*USDA WB CAMPY*
*INCIDENCE RATE BY QUARTER*

*USDA WB CAMPY*
*INCIDENCE RATE BY QUARTER*

AUTOMATED CLEAN IN PROCESS (CIP) SYSTEM

CROSS-REFERENCES TO RELATED APPLICATIONS

This application is a divisional of U.S. application Ser. No. 17/930,999, now U.S. Pat. No. 12,022,852, filed on Sep. 9, 2022, claims the benefit of U.S. Provisional Application No. 63/242,575, filed on Sep. 10, 2021, the contents of which are incorporated herein by reference in their entirety.

BACKGROUND

In the context of food disinfection systems, clean-in-place (CIP) refers to the cleaning of any process equipment that may be subject to buildup of material that can cause contamination to the product. This material is typically made up of dirt, bacteria, chemical build up, and the like, and must be removed.

Existing CIP systems and methods, however, can be cumbersome to use and can also be inefficient in their use. Accordingly, there is a long-felt need for improved CIP systems and methods.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an aspect, the present disclosure provides a foodstuff treatment system. In an embodiment, the foodstuff treatment system comprises a first foodstuff treatment module, the first foodstuff treatment module configured to receive a foodstuff, a foodstuff disinfecting fluid, and a cleaning fluid; and a fluidic pathway, the fluidic pathway comprising: a delivery section configured to communicate fluid within the fluidic pathway in a direction toward the first foodstuff treatment module, a first supply section in fluid communication with the delivery section and associated with the first foodstuff treatment module, a return section configured to communicate fluid within the fluidic pathway in a direction away from the first foodstuff treatment module, and the fluidic pathway being configurable for any one or more of: (State 1) communicating a foodstuff disinfecting fluid to the first foodstuff treatment module via the delivery section and the first supply section while the first foodstuff treatment module is in fluidic isolation from the return section; (State 2) communicating a cleaning fluid to the first foodstuff treatment module via the delivery section and the first supply section while the first foodstuff treatment module is in fluidic isolation from the return section; and (State 3) communicating the cleaning fluid to the first foodstuff treatment module via the delivery section and the first supply section while the first foodstuff treatment module is in fluidic communication with the return section.

In another aspect, the present disclosure provides a method, comprising operating a system, such as a foodstuff treatment system, according to any embodiment of the present disclosure.

In another aspect, the present disclosure provides a method comprising converting a system, such as a foodstuff treatment system, according to any embodiment of the present disclosure between any one of State 1, State 2, and State 3 and any other one of State 1, State 2, and State 3.

In another aspect, the present disclosure provides a method for treating a foodstuff, such as with a foodstuff treatment system, and cleaning the foodstuff treatment system. In an embodiment, the method comprises (State 1) communicating a foodstuff treatment fluid via a fluidic pathway to a first foodstuff treatment module so as to disinfect a foodstuff disposed within the first foodstuff treatment module; and at least one of: (State 2a) communicating, via the first portion of the fluidic pathway, a cleaning fluid to the first foodstuff module so as to disinfect the first portion of the fluidic pathway and the first foodstuff module, and (State 2b) communicating, via the first portion of the fluidic pathway, the cleaning fluid to a second portion of the fluidic pathway that at least partially forms a loop with the first portion of the fluidic pathway, the communicating disinfecting the first portion of the fluidic pathway and the second portion of the fluidic pathway.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
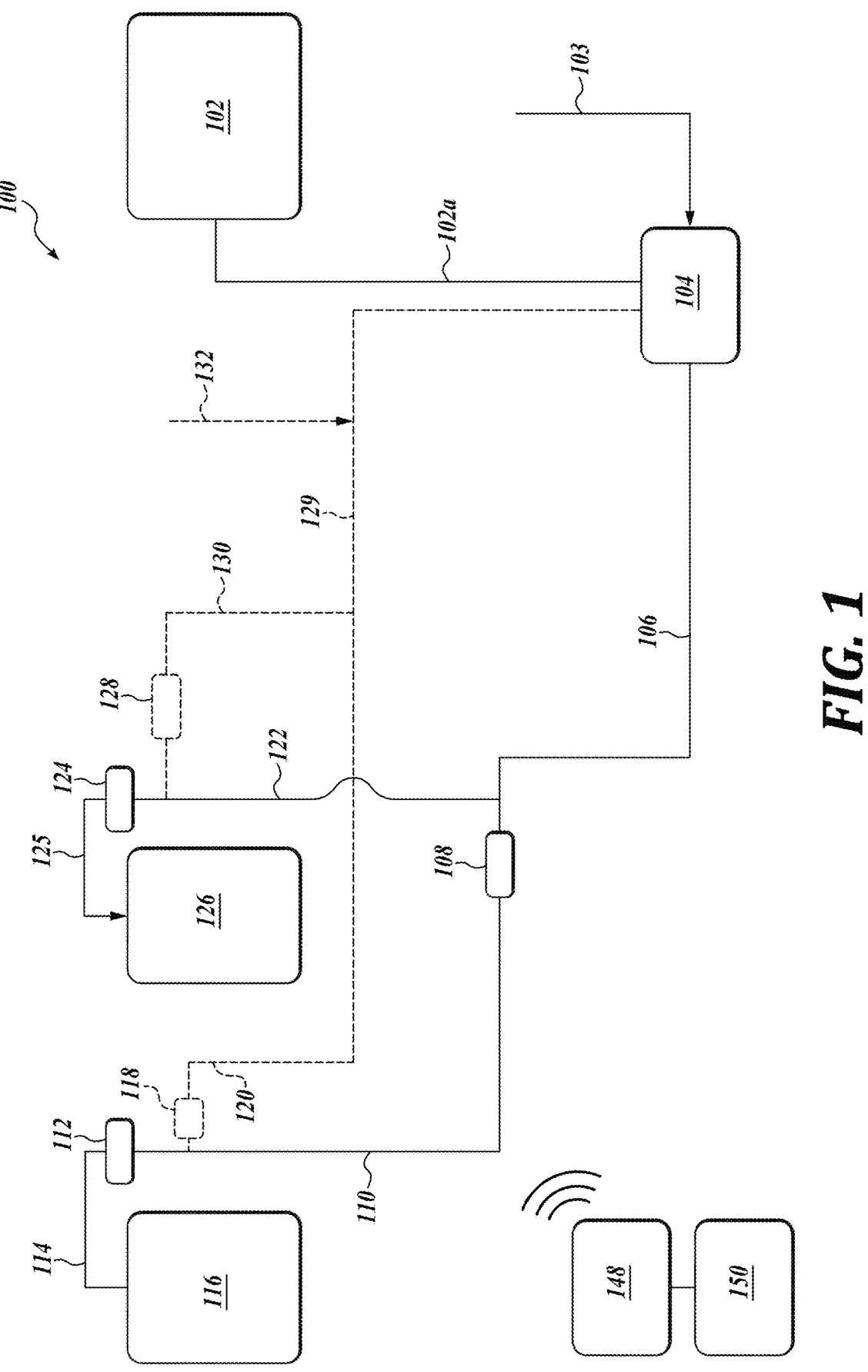
FIG. 1 provides a view of an exemplary embodiment of the disclosed technology.

Embodiments of a foodstuff processing system and related methods of use are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

FIGURES

For the reader's convenience, the elements of the attached figures are provided below:

- 100—Foodstuff treatment system
- 102—Upstream treatment module (e.g., a chiller)
- 102*a*—Input from upstream treatment module
- 103—Chemical input (e.g., cleaning fluid)
- 104—Holding tank
- 106—Portion of delivery section of fluidic loop
- 108—Valve
- 110—Portion of delivery section of fluidic loop
- 112—Valve
- 114—Delivery section (associated with first treatment module 116)
- 114*a*—Delivery section
- 116—First treatment module
- 118—Valve
- 118*a*—Valve
- 118*b*—Delivery section (associated with second treatment module 126)
- 120—Portion of return section
- 122—Portion of delivery section
- 124—Valve
- 124*a*—Valve
- 124*b*—Delivery section (associated with second treatment module 126)
- 125—Delivery section (associated with second treatment module 126)
- 126—Second treatment module 128—Valve
128a—Valve
129—Return section
130—Return section
132—Return section input
140—Redwater chiller
141—Redwater chiller inlet
142—Redwater chiller outlet
143—Valve
144—Redwater supply to second treatment module
145—Valve
146—Redwater supply to return section
148—Controller
150—User Interface
200—Foodstuff treatment system
300—Foodstuff treatment system The appended non-limiting figures illustrate embodiments of the disclosed technology. It should be understood, however, that the appended figures (and their related description) are illustrative only and do not limit the scope of the present disclosure or the appended claims.

In an aspect, the present disclosure provides a foodstuff treatment system. In this regard, attention is directed to FIG. 1, in which a foodstuff treatment system 100, according to an embodiment of the present disclosure, is illustrated. In the illustrated embodiment, the foodstuff treatment system 100 is shown to include a first foodstuff treatment module 116, the first foodstuff treatment module 116 configured to receive a foodstuff, a foodstuff disinfecting fluid, and a cleaning fluid; and a fluidic pathway. As shown, the fluidic pathway, which comprise one or more tubes, channels, and the like, comprises a delivery section (generally indicated as a solid line) configured to communicate fluid within the fluidic pathway in a direction toward the first foodstuff treatment module 116, a first supply section in fluid communication with the delivery section and associated with the first foodstuff treatment module 116, a return section (generally indicated as a dashed line) configured to communicate fluid within the fluidic pathway in a direction away from the first foodstuff treatment module 116.

As discussed further herein in greater detail, the fluidic pathway of the system 100 is configurable into several states for treating (e.g., disinfecting) a foodstuff and cleaning portions of the system 100. In an embodiment, such states include: (State 1) communicating a foodstuff disinfecting fluid to the first foodstuff treatment module 116 via the delivery section and the first supply section while the first foodstuff treatment module 116 is in fluidic isolation from the return section; (State 2) communicating a cleaning fluid to the first foodstuff treatment module 116 via the delivery section and the first supply section while the first foodstuff treatment module 116 is in fluidic isolation from the return section; and (State 3) communicating the cleaning fluid to the first foodstuff treatment module 116 via the delivery section and the first supply section while the first foodstuff treatment module 116 is in fluidic communication with the return section 129.

As shown in FIG. 1, system 100 can include upstream treatment module 102 (e.g., a chiller, such as a finishing chiller), which finishing chiller 102 can provide input 102a to holding tank 104. Input 102a can be overflow from upstream treatment module 102, e.g., excess foodstuff processing fluid (such as a solution that comprises peracetic acid). As discussed further herein with respect to the Examples of the present disclosure, such as EXAMPLES 1 and 2, by using overflow from the upstream treatment module 102 in treating the foodstuffs in the downstream foodstuff treatment modules, such as first treatment module 116, reductions in water usage and foodstuff treatment fluid are possible. Holding tank 104 can also receive chemical input 103. Chemical input 103 can include, e.g., a caustic wash, an acid wash, and/or a sanitation wash.

Example caustic washes include sodium hydroxide and other hydroxides. Without being bound to any particular theory, a caustic wash can be useful to soften or even remove fat buildup. The pH of the caustic can be in a range from about 7 to about 14, from about 8 to about 14, from about 9 to about 14, from about 10 to about 14, from about 11 to about 14, from about 12 to about 14, from about 13 to about 14, or even about 14.

Example acid washes include solutions made using a strong acid; an acidic solution can have a concentration of less than 1%. Example (non-limiting) acids include nitric, phosphoric, peracetic, and citric acids. Without being bound to any particular theory or embodiment, an acid wash can be useful to remove scaling (e.g., calcium deposits) and any other deposits that form within the system 100.

A sanitation fluid can be, e.g., a solution made using a hypochlorite solution (or bleach). Without wishing to be bound by any particular theory or embodiment, a benefit of this sanitation fluid is that it can reduce microorganism growth, such as to meet regulatory levels.

A cleaning fluid can be applied at a relatively high temperature, e.g., a temperature in a range from about 37 deg. C. to about 100 deg. C. (e.g., 49 deg. C.) and all intermediate values. A cleaning fluid can also be applied at a comparatively high velocity; without being bound to any particular theory, within a range, the higher the fluid velocity, the better mixing/agitation occurs within the pipe, and higher fluid velocities can help scrape the contaminations, such as biofilm buildup, off walls of the process equipment. See FIG. 8A. A fluid velocity in a system 100 according to the present disclosure can be, e.g., greater than about 1.5 m/sec, e.g., from about 1.5 to about 5 m/sec, and all intermediate values. Circulation of cleaning fluid can thus be performed to disrupt/agitate material that may have accumulated on the pipe walls of the system 100. In an embodiment, a pH of cleaning fluid can be above about 12 or below about 3, which is configured to reduce biofilm buildup in the fluidic pathway and reduce incidence of bacterial infection. See, for example, EXAMPLE 3.

Fluid from holding tank 104 can be communicated to delivery section 106 of the fluidic loop of the system 100. Valve 108 can be used to control flow within the delivery section 106 of the fluidic loop; as shown, valve 108 can be adjusted to allow fluid to pass from holding tank 104 to one or both of first foodstuff treatment module 116 and second foodstuff treatment module 126.

Fluid that passes valve 108 continues to portion 110 of the delivery section of the fluidic loop. Valve 112 can be modulated to allow fluid passage from the delivery section 114 (associated with first treatment module 116), then on to first treatment module 116. This can be effected when the system 100 is in a foodstuff processing state (such as State 1); as shown, foodstuff disinfecting fluid can be communicated from upstream treatment module 102 (as overflow from that module 102), which fluid can then be communicated to first treatment module 116. This allows for efficient use of the disinfection fluid from the upstream treatment module 102. Instead of being disposed of, overflow fluid from upstream module 102 can be utilized to disinfect a foodstuff in first treatment module 116. Valve 118 can be closed when the system 100 is operating in processing mode, such that foodstuff disinfection fluid is communicated to first treatment module 116 while first treatment module 116 is in fluid isolation (via valve 118) from the return section (shown in FIG. 1 by the dashed line) of the fluidic loop.

As shown, valve 118 can be modulated so as to allow fluid communicated from delivery section into the return section, e.g., portion 120 of the return section. Such fluid can be further communicated to other parts (e.g., portion 129) of the return section. Such fluid can be further communicated to holding tank 104, as shown in FIG. 1.

In this way, cleaning fluid (e.g., a fluid that includes at least some material from chemical input 103) can be communicated within the delivery section (e.g., portions 106 and 110) of the fluidic loop so as to clean the delivery section of the fluidic loop, and then also be communicated (via the return loop, e.g., via portions 120 and 129) back to holding tank 104. This can be accomplished when valve 112 is closed, thereby placing first treatment module 116 in fluid isolation from the return section of the fluidic loop. Such cleaning fluid can then be recycled through the delivery section and the return section of the system 100 for the desired time, e.g., so as to disinfect that portion of the system 100. By closing valve 118 (and opening valve 112), cleaning fluid can be directed to first treatment module 116, where the cleaning fluid can then be disposed of after cleaning the first treatment module 116.

As also shown in FIG. 1, valve 108 can be modulated such that fluid from delivery section 106 can be directed (when valve 124 is open and valve 128 is closed) to second treatment module 126. Such fluid can be foodstuff disinfection fluid that treats a fluid disposed within second treatment module 126, e.g., overflow foodstuff disinfection fluid from upstream treatment module 102. As discussed elsewhere herein, by using overflow foodstuff disinfection fluid, reductions in water usage and foodstuff disinfection fluid chemical are possible. See EXAMPLES 1 and 2.

Such fluid can also be, e.g., cleaning fluid that then cleans second treatment module 126, e.g., at the end of a use cycle or shift. Such cleaning fluid can then be disposed of, e.g., via a drain.

When valve 124 is closed and valve 128 is open, fluid communicated via portion 122 of the delivery section is then communicated via portion 130 (and portion 129) of the return section of the fluidic loop. Such fluid can then be communicated back to holding tank 104. It should be understood that hot water (or other fluid) can be provided to the return section via return section input 132. Hot water is considered an especially suitable input, but other fluids (e.g., acids, caustics, sanitizing solutions) can also be introduced via input 132.

Thus, in a foodstuff processing state, foodstuff disinfection fluid (which can be—but need not be—overflow fluid from upstream treatment module 102 that is communicated via input 102*a*) is communicated within portion 106 and portion 110 of the delivery section of the fluidic loop; this can be effected when valve 102 is open and (optionally) when valve 124 is closed. Such foodstuff disinfection fluid is then communicated to first treatment module 116 via portion 114 of the delivery section; this can be accomplished when valve 118 is closed. Disinfection fluid introduced to the first treatment module 116 can then be disposed of, e.g., via a suitable drain. Foodstuff that is treated in the first treatment module 116 can, in some instances, be transferred to second treatment module 126; this transfer can be accomplished in an automated fashion (which can also be according to a predetermined schedule), but this is not a requirement, as the transfer can also be accomplished manually, and the transfer need not be accomplished according to any particular schedule.

Foodstuff disinfection fluid can also be transported via portion 122 of the delivery section of the fluidic loop to second treatment module 126. This can be accomplished, e.g., when valve 108 is closed, valve 124 is open, and valve 128 is closed. The foregoing valve configuration, however, is not a requirement, as foodstuff disinfection fluid communicated within the delivery section of the fluidic loop can be transferred simultaneously to first treatment module 116 via delivery section 114 and to second treatment module 126 via delivery section 125. Alternatively, a user may elect to communicate disinfection fluid to only one of first treatment module 116 and second treatment module 126 at a time. Should a user elect to communicate disinfection fluid to second treatment module 126, that can be accomplished by closing valve 108, opening valve 124, and closing valve 128, such that the disinfection fluid is communicated via portion 122 of the delivery section to the second treatment module 126 via delivery section 125 associated with the second treatment module.

In a first cleaning (i.e., cleaning-in-place) state, the system 100 can be operated such that cleaning fluid is communicated via portion 106 and portion 110 of the delivery section. Valve 112 can be closed and valve 118 can be open, which in sum allows the cleaning fluid to communicate to portion 129 of the return section of the fluidic loop, where the cleaning fluid is returned to holding tank 104, as shown. Valve 128 can be closed when the system 100 in this state, although that is not a requirement. In this state, the system 100 is operated so as to clean the delivery section (and the return section) without also cleaning the first module 116. This allows a user to clean the fluidic loop of the system 100, and then clean the treatment module 116 (or modules 116 and 126) comprised within the system 100.

In a further cleaning state, the system 100 can be operated such that cleaning fluid is communicated to second module 126. As shown, that can be accomplished by closing valve 108, opening valve 124, and closing valve 128, such that the cleaning fluid is communicated via portion 122 of the delivery section to the second treatment module 126 via delivery section 125 associated with the second treatment module. Cleaning fluid that cleans module 126 can be disposed of. Thus, system 100 can be converted between different states for foodstuff disinfection and also for cleaning of the components (e.g., the fluidic loop and the treatment modules) of the system 100.

In the illustrated embodiment, the system 100 is shown to include a controller 148. In an embodiment, the controller 148 is operatively coupled to one or more components of the system 100 (such as valves, pumps, and the like) to choreograph their operation in performing the methods, such as method 400 discussed further herein with respect to FIGURE, according to embodiments of the present disclosure. Controller 148 may include software/firmware logic executing on a microcontroller, hardware logic (e.g., application specific integrated circuit, field programmable gate array, etc.), or a combination of software and hardware logic. Although FIG. 1 illustrates controller 148 as a distinct functional element, the logical functions performed by controller 148 may be decentralized across a number of hardware elements. Controller 148 may further include input/output (I/O) ports, communication systems, or otherwise.

As shown, controller 148 is operatively coupled to user interface 150 configured to receive user input and provide user control over the system 100. User interface 150 may include one or more buttons, dials, joysticks, feedback displays, indicator lights, etc. In an embodiment, the user interface 150 is configured to track, measure, and control, for example, water use, temperature, pH, concentration, fill levels, etc. in vessels and hold tanks. In an embodiment, the user interface 150 is configured to generate one or more signals based on an input received from a user for receipt by the controller; such signals may be used to control or operate the system 100 based on user input.

Figure 2:
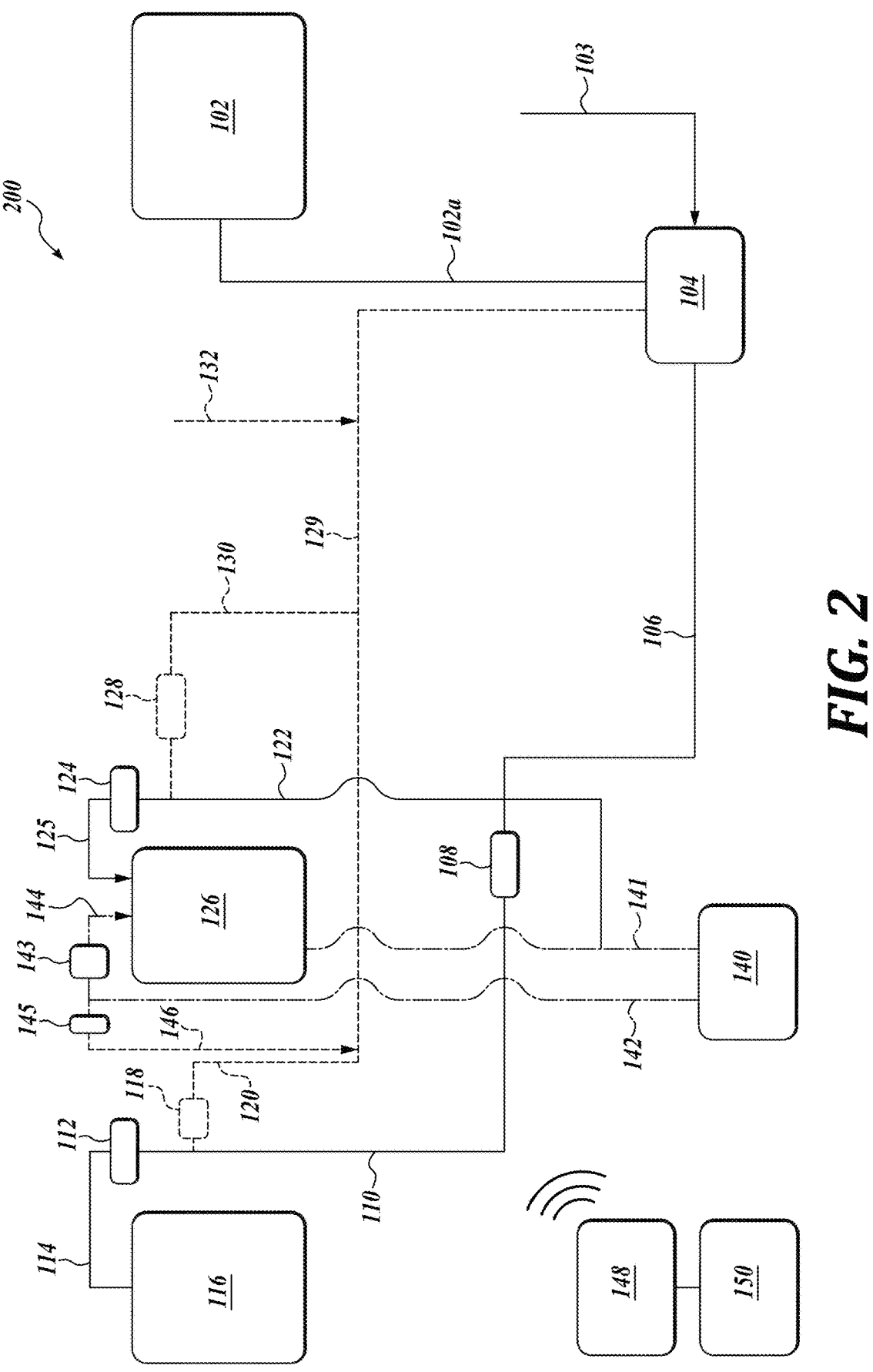
FIG. 2 provides a view of an exemplary embodiment of the disclosed technology.

FIG. 2 provides an alternative, non-limiting embodiment of the disclosed technology. In this regard, FIG. 2 illustrates a system 200 in accordance with an embodiment of the present disclosure. As shown, FIG. 2 (relative to FIG. 1) includes the additional, optional feature of a redwater chiller portion. Although this redwater chiller portion is shown in FIG. 2 as associated with second treatment module 126, it should be understood that this is illustrative only.

As shown in FIG. 2, a redwater chiller 140 is associated with second treatment module 126. As depicted, redwater chiller 140 can operate to chill fluid delivered by redwater chiller inlet 141 to redwater chiller 140. Chilled fluid from redwater chiller 140 then exits via redwater outlet 142. Valve 145 can be closed and valve 143 can be open, in which configuration fluid from redwater chiller outlet 142 then enters second treatment module 126 by way of redwater supply section 144. In some embodiments, valve 124 can be closed; in such an embodiment, fluid from delivery section 122 can be sent to redwater chiller 140 via redwater chiller inlet 141. Although not shown, fluid from delivery section 122 can also be sent directly to redwater chiller 140 (i.e., without first passing within redwater chiller inlet 141), although this is not a requirement. Thus, when system 200 is in foodstuff processing mode, foodstuff disinfection fluid from the second treatment module 126 can be circulated to a redwater chiller 140, chilled, and then returned to the second treatment module 126.

Valve 143 can be closed and valve 145 can be opened, which configuration can be useful when the system 200 is in clean-in-place (CIP) mode. More specifically, cleaning fluid can be delivered via portion 106 of the delivery section of the fluidic loop, e.g., with valve 108 closed, valve 128 closed, and valve 124 closed. In such a configuration, the cleaning fluid then enters redwater chiller 140 via redwater chiller inlet 141, and exits redwater chiller 140 via redwater chiller outlet 142. Valve 143 can be closed and valve 145 opened, in which configuration the cleaning fluid can be communicated via the redwater supply 144 to return section 146 to the return section 120 of the fluidic loop. In this way, a system 200 according to the disclosed technology can include a redwater chiller 140, which redwater chiller 140 can (1) operate as part of the system 200 when the system 200 is in foodstuff processing mode; and (2) be cleaned by cleaning fluid when the system is in CIP mode. It should be understood that although FIG. 2 shows a redwater chiller 140 associated only with the second treatment module 126, a system 200 according to the present disclosure can include multiple redwater chillers, e.g., a separate redwater chiller associated with one or more of the foodstuff treatment modules (such as first treatment module 116 and second treatment module 126) of the system 200. As but one example, a system can include three foodstuff treatment modules, with two of the three treatment modules having a redwater chiller associated therewith.

Figure 3:
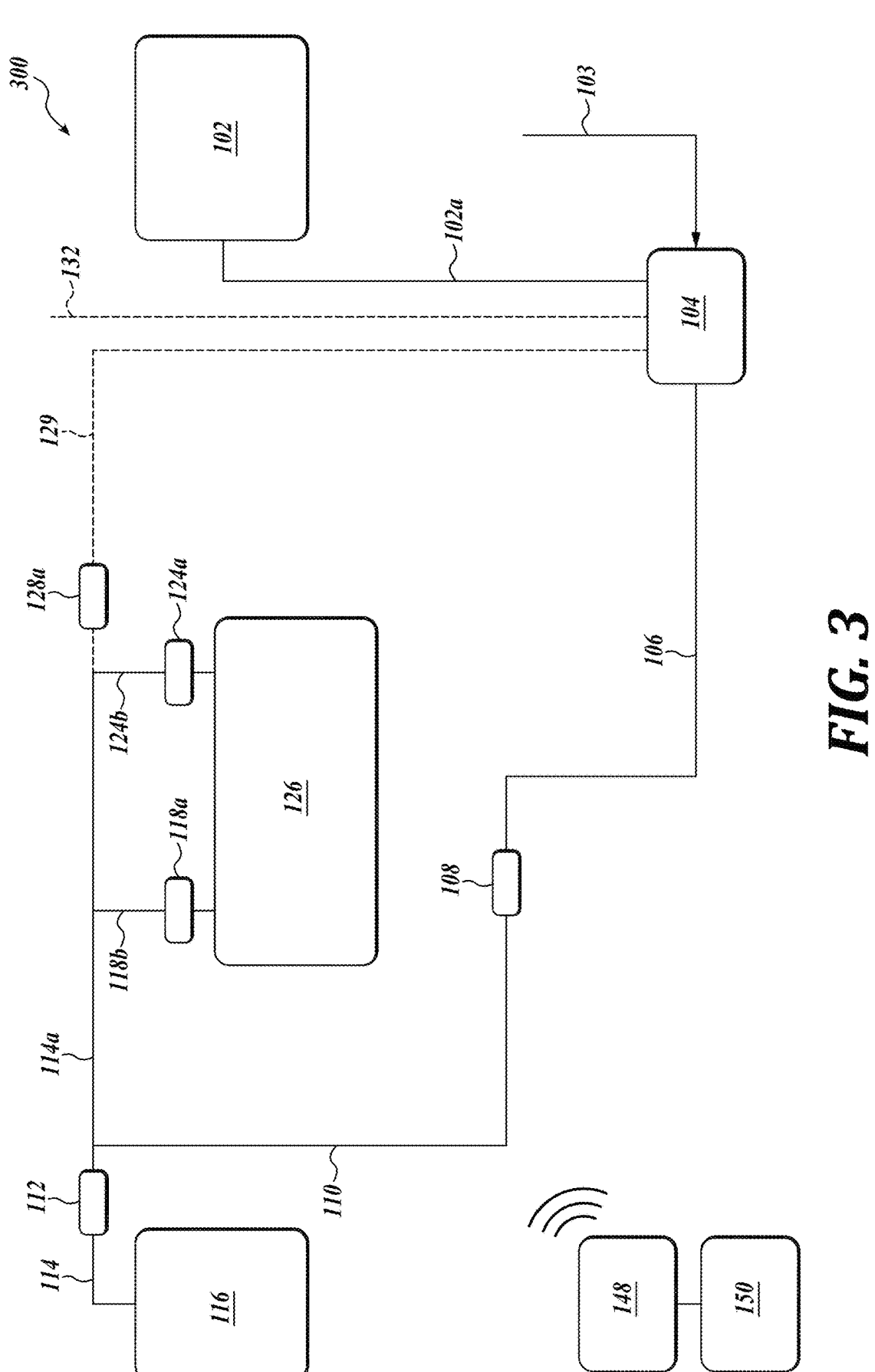
FIG. 3 provides a view of an exemplary embodiment of the disclosed technology.

FIG. 3 provides an illustration of another system 300 according to embodiment of the disclosed technology. As shown, system 300 can include an upstream treatment module 102, which can be connected via input 102a to holding tank 104. Chemical input 103 can optionally be present.

Fluid from holding tank 104 can be communicated to delivery section 106 of the fluidic loop of the system 300. Valve 108 can be used to control flow within the delivery section of the fluidic loop; as shown, valve 108 can be adjusted to allow fluid to pass from holding tank 104 to one or both of first treatment module 116 and second treatment module 126.

Valve 112 can be open so as to allow fluid from delivery section 110 to pass into first treatment module 116 via delivery section 114. A valve (not shown) can be positioned to as to prevent fluid flow from delivery section 110 into delivery section 114a, although this is not a requirement. Valve 112 can also be closed such that fluid communicated via delivery section 110 is then communicated to delivery section 114a. Valve 128a can be closed, which in turn promotes fluid communication from delivery section 114a to second foodstuff treatment module 126, by way of delivery section 118b (when valve 118a is open) and/or by way of delivery section 124b (when valve 124a is open). Valve 128a can be closed such that system 300 is operated in food processing mode to supply foodstuff disinfection fluid from delivery section 106 to one or both of first treatment module 116 and second treatment module 126.

System 300 can also be operated in CIP mode. In CIP mode, cleaning fluid can be delivered to one or both of first treatment module 116 and/or second treatment module 126. CIP mode can include a state in which valve 108 is open, valve 112 is closed, valve 118a is closed, valve 124a is closed, and valve 128a is open; in this way, the fluidic loop of the system 300 is cleaned by way of cleaning fluid circulating through delivery section 106, delivery section 110, delivery section 114a, and return section 129. As shown, return section input 132 can provide material, e.g., hot water, to fluid in the return section of the fluidic loop. In this way, the fluidic loop can be cleaned for the desired/ necessary period of time, after which cleaning fluid can be communicated to one or both of first treatment module 116 and second treatment module 126. As shown (and also as explained), the cleaning fluid can be delivered to one of first treatment module 126 and second treatment module 126 and then the other of first treatment module 126 and second treatment module 126. Alternatively, the cleaning fluid can be delivered to both first treatment module 126 and second treatment module 126 simultaneously.

Figure 4:
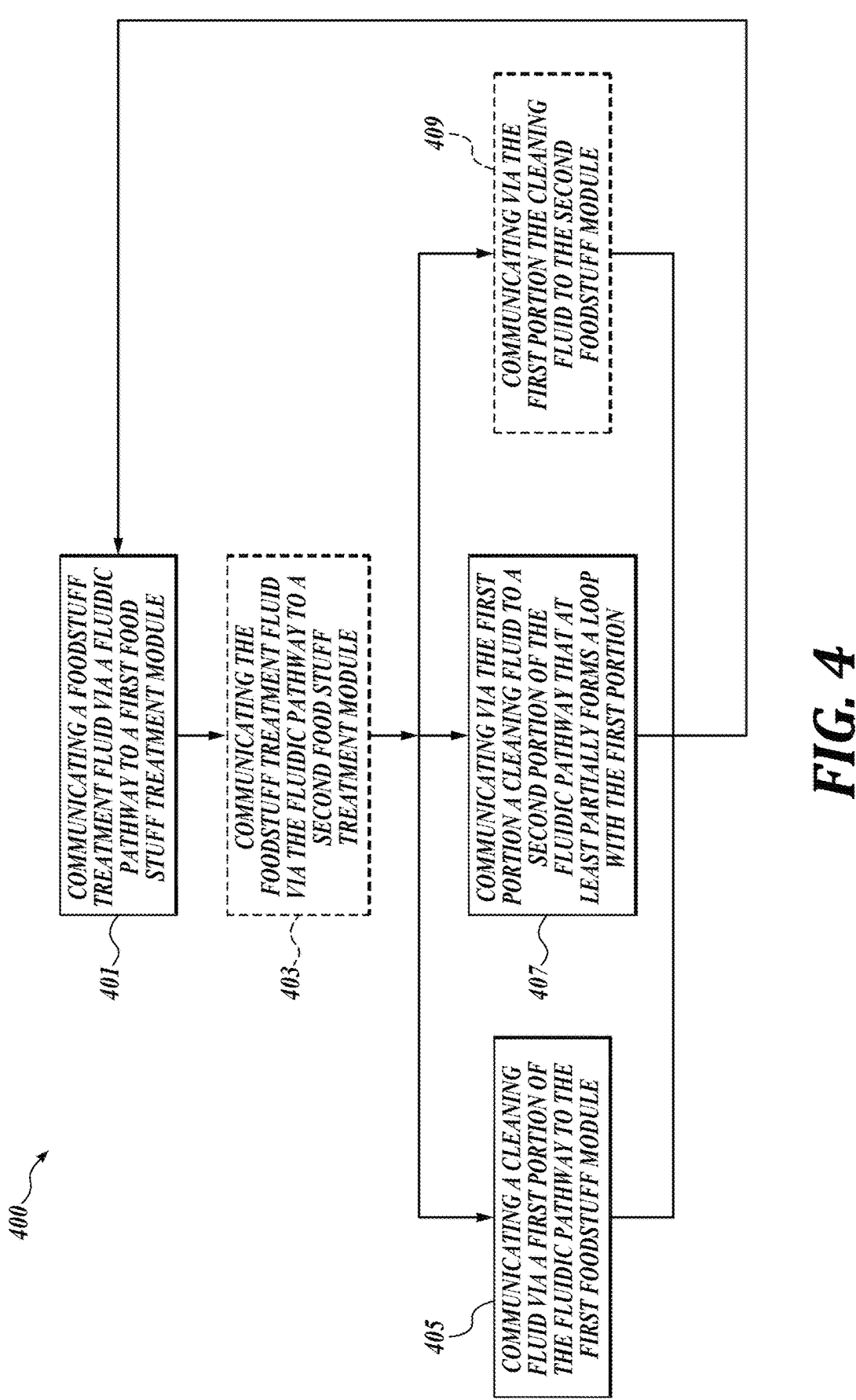
FIG. 4 is a block diagram illustrating a method according to an embodiment of the present disclosure.

In another aspect, the present disclosure provides a method, such as a method of treating a foodstuff with a foodstuff treatment system and cleaning and/or disinfecting the foodstuff treatment system. In this regard, attention is directed to FIG. 4 in which a method 400, in accordance with an embodiment of the present disclosure, is illustrated. In an embodiment, method 400 is an example of operating the foodstuff treatment systems described herein, such as foodstuff treatment systems 100, 200, and 300 discussed further herein with respect to FIGS. 100, 200, and 300, respectively. In an embodiment, method 400 is an example of converting a system, such as one or more of systems 100, 200, or 300, from a first state, such as State 1, State, 2, or State 3 to a different state selected from another of State 1, State 2, or State 3.

In an embodiment, method 400 begins with process block 401, which includes communicating a foodstuff treatment fluid via a fluidic pathway to a first foodstuff treatment module, such as first foodstuff treatment module 116, so as to disinfect a foodstuff disposed within the first foodstuff treatment module.

In an embodiment, disinfecting the foodstuff reduces a number or an amount of pathogens disposed in or on the foodstuff. In an embodiment, the pathogen is a bacterium, such as *Salmonella enterica, Listeria monocytogenes, Escherichia coli, Clostridium botulinum, Clostridium difficile, Campylobacter, Bacillus cereus, Vibrio parahaemolyticus, Vibrio cholerae, Vibrio vulnificus, Staphylococcus aureus, Yersinia enterocolitica, shigella*, or a combination thereof. In an embodiment, the pathogen is a virus such as enterovirus, norovirus, influenza, rotavirus, or a combination thereof. In an embodiment, the pathogen is or a parasite such as *Cryptosporidium, Toxoplasma gondii, Giardia duodenalis, Cyclospora cayetanensis, Trichinella spiralis, Taenia saginata, Taenia solium*, or a combination thereof.

The methods and systems of the present disclosure are not limited by foodstuff treated according to the methods or with the systems of the present disclosure. In an embodiment, the foodstuffs are selected from a meat product, such as a poultry product, a beef product, a pork product, or a seafood product; an egg; a produce product, such as a fruit, a vegetable, algae, a seed, a grain, a sprout, a legume, soy, or a nut; and a dairy product.

In an embodiment, process block 401 is followed by process block 403, which includes communicating the foodstuff treatment fluid via the fluidic pathway to a second foodstuff treatment module, such as second foodstuff treatment module 126, so as to disinfect a foodstuff disposed within the second foodstuff treatment module. In an embodiment, process block 403 is optional.

In an embodiment, process block 401 or 403 is/are followed by one or more of process blocks 405 and 407. As shown, process block 405 includes communicating, via the first portion of the fluidic pathway, a cleaning fluid to the first foodstuff module so as to disinfect the first portion of the fluidic pathway and the first foodstuff module. In an embodiment, process block 405 is an example of State 2 discussed further herein. Process block 407 is shown to include communicating, via the first portion of the fluidic pathway, the cleaning fluid to a second portion of the fluidic pathway that at least partially forms a loop with the first portion of the fluidic pathway, the communicating disinfecting the first portion of the fluidic pathway and the second portion of the fluidic pathway. In an embodiment, process block 407 is an example of State 3 discussed further herein. In an embodiment, process blocks 405 and 407 are performed simultaneously, as shown. In an embodiment, process blocks 405 and 407 are performed sequentially. In an embodiment, only one of process blocks 405 and 407 are performed.

In an embodiment, method 400 further includes process block 409, which includes communicating, via the first portion of the fluidic pathway, the cleaning fluid to the second foodstuff module, such as second foodstuff treatment module 126, so as to disinfect the first portion of the fluidic pathway and the second foodstuff treatment module. In an embodiment, process block 409 is optional.

As shown, in an embodiment, after completing one or more of process blocks 405, 407, and 409, method 400 reverts to process block 401, such as to repeat the method 400. In an embodiment, the method 400 is repeated one or more times, such as in repeatedly disinfecting a foodstuff and subsequently cleaning-in-place a system used in such disinfection.

Certain processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

ASPECTS

The following Aspects are illustrative only and do not limit the scope of the present disclosure or the appended claims.

Aspect 1. A foodstuff treatment system, comprising: a first foodstuff treatment module, the first foodstuff treatment module configured to receive a foodstuff, a foodstuff disinfecting fluid, and a cleaning fluid; and a fluidic pathway, the fluidic pathway comprising a delivery section configured to communicate fluid within the fluidic pathway in a direction toward the first foodstuff treatment module, a first supply section in fluid communication with the delivery section and associated with the first foodstuff treatment module, and a return section configured to communicate fluid within the fluidic pathway in a direction away from the first foodstuff treatment module, and the fluidic pathway being configurable for any one or more of:

(State 1) communicating foodstuff disinfecting fluid to the first foodstuff treatment module via the delivery section and the first supply section while the first foodstuff treatment module is in fluidic isolation from the return section;

(State 2) communicating cleaning fluid to the first foodstuff treatment module via the delivery section and the first supply section while the first foodstuff treatment module is in fluidic isolation from the return section;

(State 3) communicating cleaning fluid to the first foodstuff treatment module via the delivery section and the first supply section while the first foodstuff treatment module is in fluidic communication with the return section.

Aspect 2. The foodstuff treatment system of Aspect 1, further comprising a second foodstuff treatment module, the second foodstuff treatment module configured to receive a foodstuff, a foodstuff disinfecting fluid, and a cleaning fluid, and the second foodstuff treatment module.

Aspect 3. The foodstuff treatment system of Aspect 1, wherein the fluidic pathway comprises a second supply section, the second supply section being associated with the second foodstuff treatment module, and wherein the fluidic pathway is configurable for communicating foodstuff disinfecting fluid to the second foodstuff treatment module via the delivery section and the second supply section.

Aspect 4. The foodstuff treatment system of Aspect 3, wherein the fluidic pathway is configurable for communicating cleaning fluid to the second foodstuff treatment module via the delivery section and the second supply section while the first foodstuff treatment module is in fluidic isolation from the second foodstuff treatment module.

Aspect 5. The foodstuff treatment system of Aspect 3, wherein the fluidic pathway is configurable for communicating cleaning fluid to the second foodstuff treatment module via the delivery section and the second supply section and for communicating cleaning fluid to the first foodstuff treatment module via the delivery section and the first supply section.

Aspect 6. The foodstuff treatment system of any one of Aspects 1-5, wherein the fluidic pathway is configurable such that at least some of the cleaning fluid communicated via the delivery section in the direction of the first foodstuff treatment module and is communicated via the return section in a direction away from the first foodstuff treatment module.

Aspect 7. The foodstuff treatment system of any one of Aspects 1-6, further comprising a controller configured to (a) modulate delivery of foodstuff treatment fluid via the delivery section to the first foodstuff treatment module, (b) modulate delivery of cleaning fluid via the delivery section to the first treatment module, or both (a) and (b).

Aspect 8. The foodstuff treatment system of any one of Aspects 1-7, in which the foodstuff treatment fluid is overflow from an upstream foodstuff treatment module.

Aspect 9. The foodstuff treatment system of any one of Aspects 1-8, further comprising a vessel in fluid communication with the fluidic pathway, the vessel being configured to contain the foodstuff treatment fluid, the cleaning fluid, or both.

Aspect 10. A method, comprising operating a system according to any one of Aspects 1-9.

Aspect 11. The method of Aspect 10, wherein the operating effects treatment, with the foodstuff treatment fluid, of a foodstuff disposed in the first foodstuff treatment module.

Aspect 12. The method of any one of Aspects 10-11, wherein the operating effects cleaning, with the cleaning fluid, of the delivery section, the first supply section, the first foodstuff treatment module, and the return section.

Aspect 13. A method, comprising converting a system according to any one of Aspects 1-9 between any one of State 1, State 2, and State 3 and any other one of State 1, State 2, and State 3.

Aspect 14. A method, comprising:

(State 1) communicating a foodstuff treatment fluid via a fluidic pathway to a first foodstuff treatment module so as to disinfect a foodstuff disposed within the first foodstuff treatment module; and at least one of (State 2a) communicating, via a first portion of the fluidic pathway, a cleaning fluid to the first foodstuff module so as to disinfect the first portion of the fluidic pathway and the first foodstuff module, and (State 2b) communicating, via a first portion of the fluidic pathway, a cleaning fluid to a second portion of the fluidic pathway that at least partially forms a loop with the first portion of the fluidic pathway, the communicating disinfecting the first portion of the fluidic pathway and the second portion of the fluidic pathway.

Aspect 15. The method of Aspect 14, further comprising communicating the foodstuff treatment fluid via the fluidic pathway to a second foodstuff treatment module so as to disinfect a foodstuff disposed within the second foodstuff treatment module.

Aspect 16. The method of Aspect 14, further comprising communicating, via a first portion of the fluidic pathway, a cleaning fluid to the second foodstuff module so as to disinfect the first portion of the fluidic pathway and the second foodstuff module.

Aspect 17. The method of Aspect 16, wherein the cleaning fluid is communicated simultaneously to the first foodstuff treatment module and the second foodstuff treatment module.

EXAMPLES

Example 1: Reductions in Water Consumption

The present Example demonstrates reductions in water consumption possible with systems and methods according to embodiments of the present disclosure.

As described elsewhere herein, the systems according to embodiments of the present disclosure are configured to and otherwise suitable to reduce consumption of water, such as chilled water, when compared to conventional systems. In certain embodiments of the present disclosure, overflow water from an upstream treatment module is configured to be received by a foodstuff treatment module, such as via a fluidic pathway. By using such overflow from an upstream treatment module, such as a finishing chiller, in other treatment modules this water is reused and, thus, reduces overall water usage.

Figure 5A:
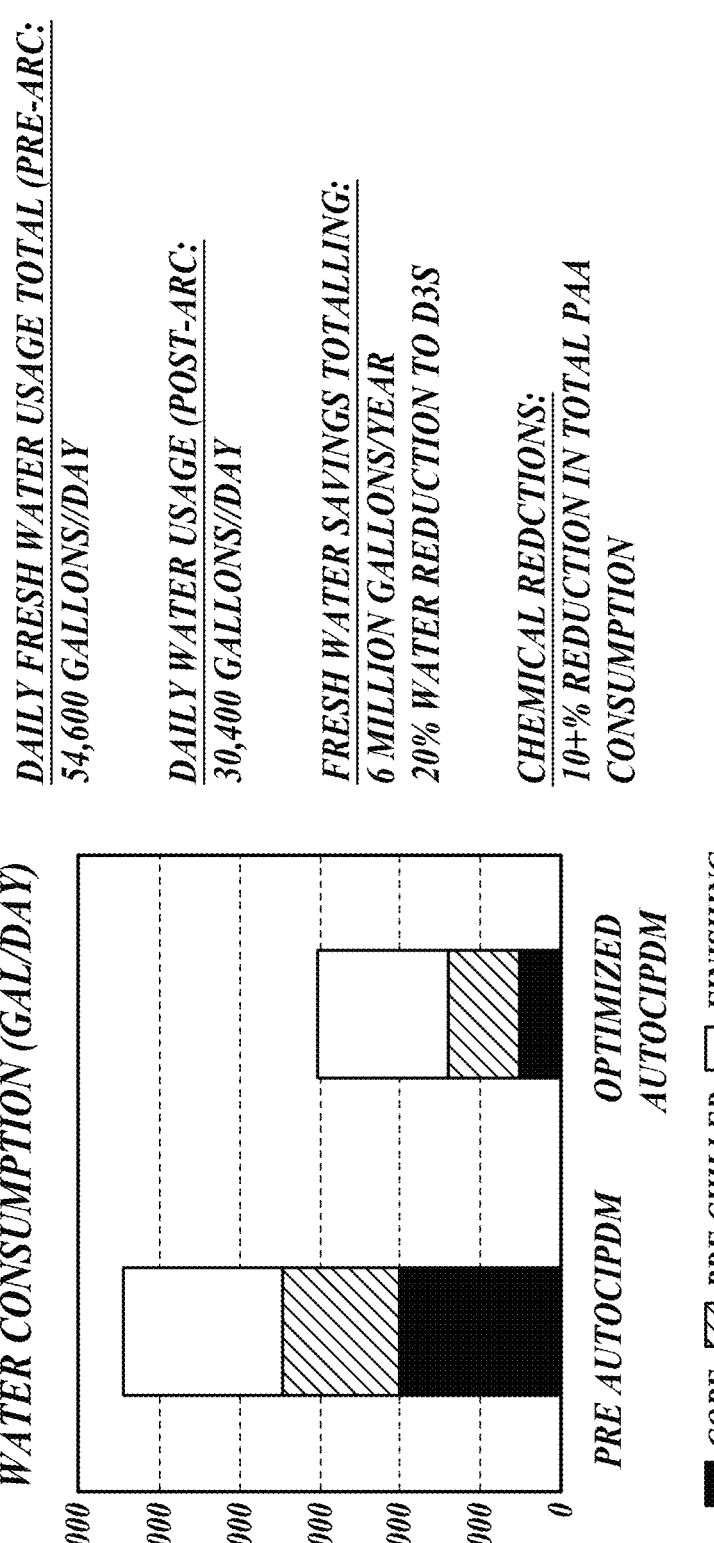
FIG. 5A graphically illustrates daily water consumption of a conventional system (left) and a system according to an embodiment of the present disclosure (right)
Figure 5B:
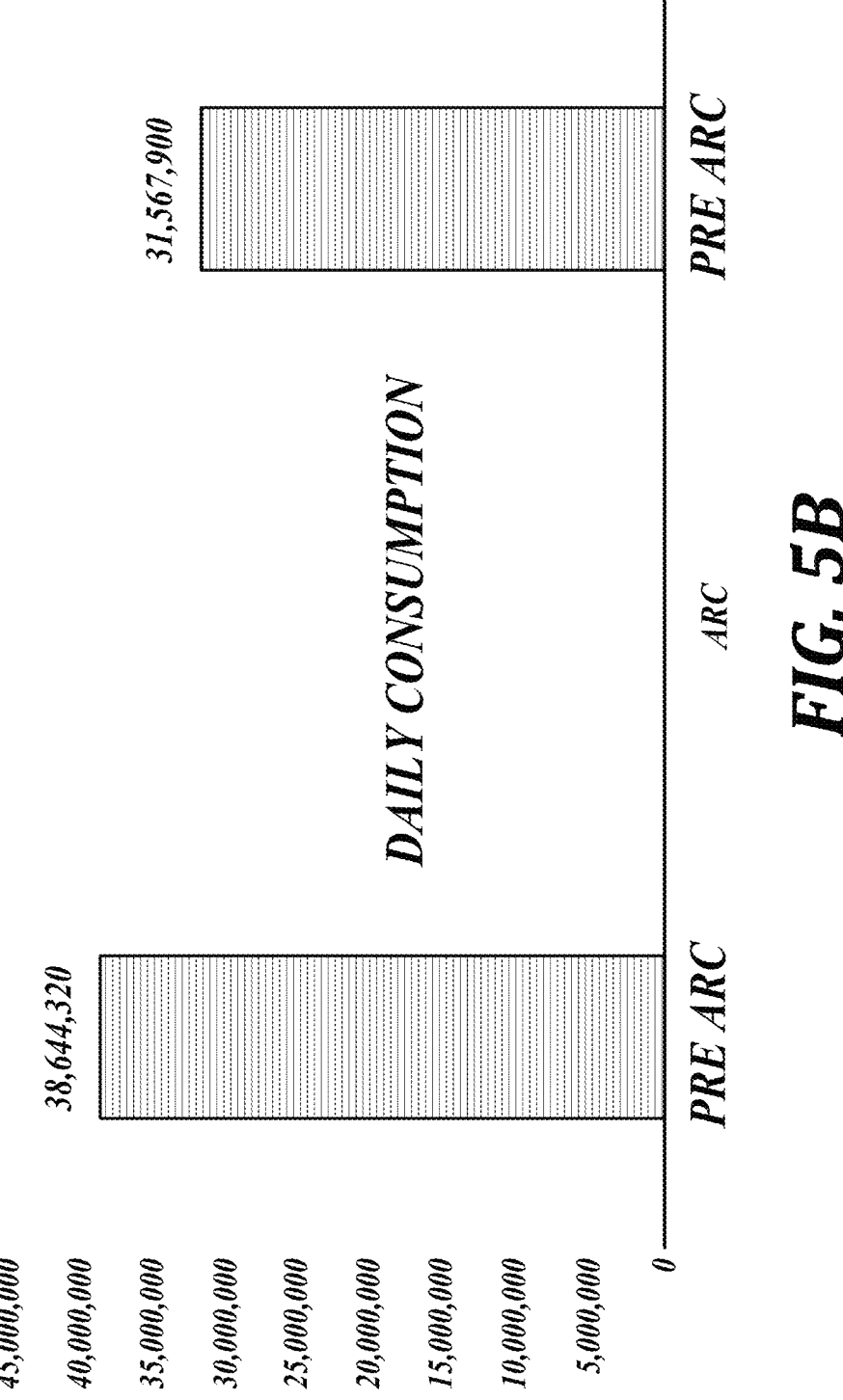
FIG. 5B graphically illustrates yearly chilled water consumption using a conventional system (left) and a system according to an embodiment of the present disclosure (right)

FIG. 5A graphically illustrates daily water consumption of a conventional system (left) illustrated as PRE AUTO-CIPDM and a system according to an embodiment of the present disclosure (right) illustrated as OPTIMIZED AUTO-CIPDM. FIG. 5B graphically illustrates yearly chilled water consumption using a conventional system (left) illustrated as PRE ARC and a system according to an embodiment of the present disclosure (right) illustrated as ARC. As shown in these FIGURES, using systems according to embodiments of the present disclosure saves large volumes of water, such as 20,000 gallons a day or more, or 6-7 million or more gallons a year. This reduction in water usage reduces operations costs, impacts on the environment, and wastewater disposal volumes, among others.

Example 2: Foodstuff Disinfecting Fluid Use Reduction

The present Example demonstrates reduction of foodstuff disinfecting fluid use in the systems and methods according to embodiments of the present disclosure.

As discussed elsewhere herein, the systems and methods of the present disclosure are suitable to reduce amounts of foodstuff disinfecting fluid used relative to conventional systems and methods. As discussed further herein with respect to EXAMPLE 1, the systems and methods according to embodiments of the present disclosure can use overflow from an upstream treatment module, which can include, for example, a foodstuff disinfecting fluid, such as peracetic acid. By reusing such foodstuff disinfecting fluid in a downstream foodstuff treatment module, overall foodstuff disinfecting fluid use can be reduced.

Figure 7:
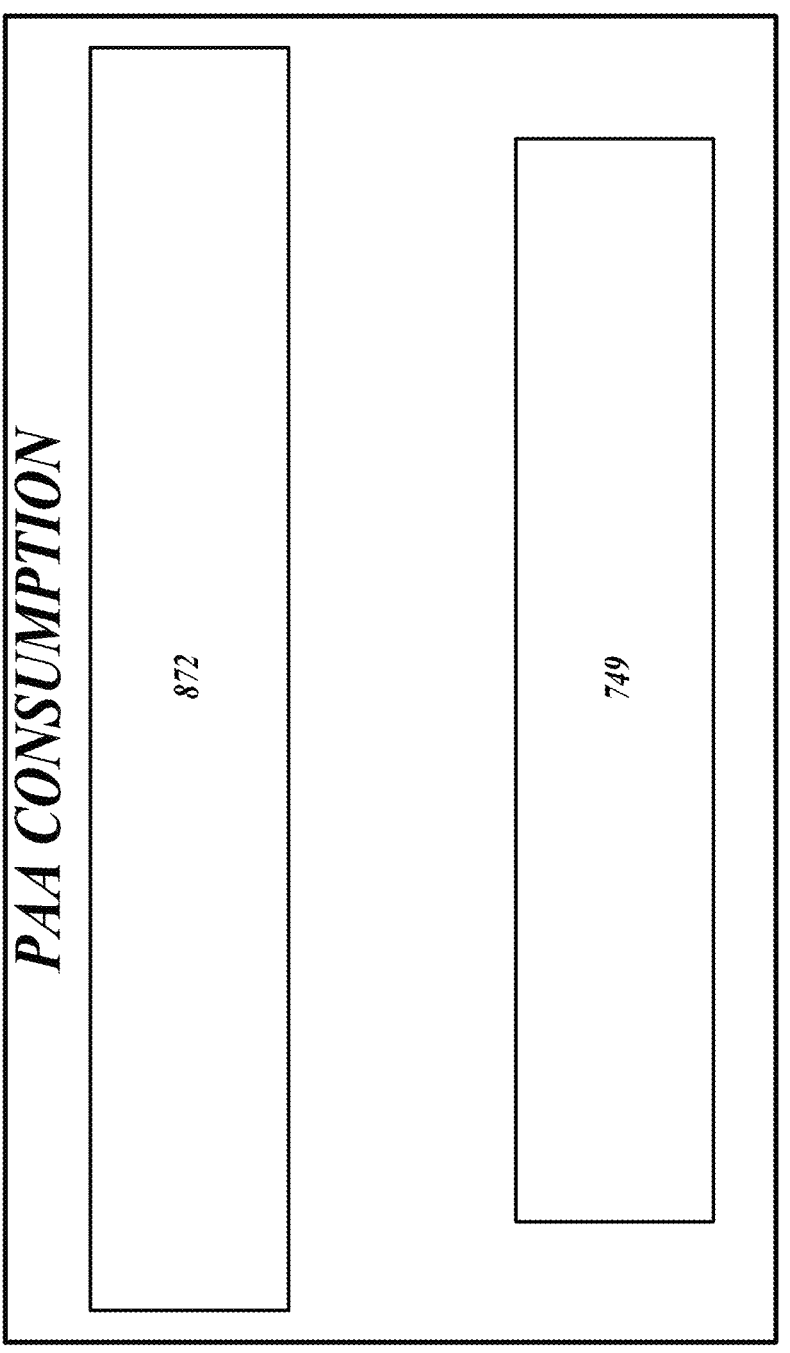
FIG. 7 graphically illustrates daily foodstuff disinfecting fluid consumption using a conventional system (top) and using a system according to an embodiment of the present disclosure (bottom)

FIG. 7 graphically illustrates daily foodstuff disinfecting fluid consumption using a conventional system (top) and using a system according to an embodiment of the present disclosure (bottom). As shown, the daily foodstuff disinfecting fluid consumption using a conventional system is 872 gallons per day, whereas the daily foodstuff disinfecting fluid consumption using a system according to an embodiment of the present disclosure is 749 gallons per day, providing a roughly 15% savings in foodstuff disinfecting fluid.

Figure 9:
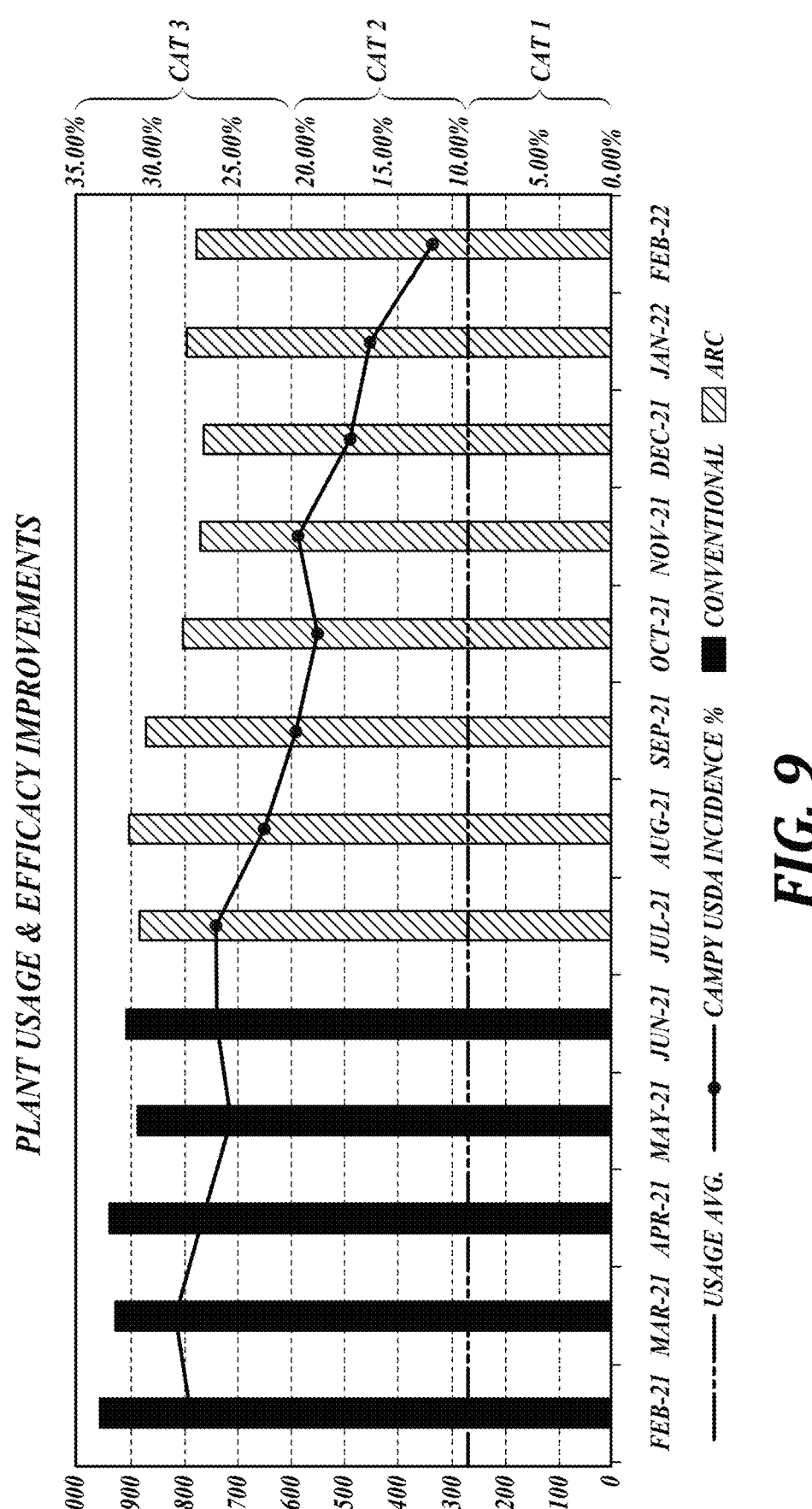
FIG. 9 graphically illustrates foodstuff disinfecting fluid use and *Campylobacter* incidence over time using a conventional system (February '21-June '21) and a system according to an embodiment of the present disclosure (July '21-February '22).

FIG. 9 also shows reductions in foodstuff disinfection fluid use using systems and methods according to embodiments of the present disclosure.

Example 3: Bacterial Incidence Reduction

The present Example demonstrates reduction in instances of bacterial infection using systems and methods according to embodiments of the present disclosure.

As discussed elsewhere herein, the systems and methods of the present disclosure are configured to and otherwise useful in reducing the incidence of bacterial infection, relative to conventional systems. In certain embodiments, the systems include a fluidic pathway, the fluidic pathway comprising a delivery section configured to communicate fluid within the fluidic pathway in a direction toward the first foodstuff treatment module, a first supply section in fluid communication with the delivery section and associated with the first foodstuff treatment module, and a return section configured to communicate fluid within the fluidic pathway in a direction away from the first foodstuff treatment module. Further, in an embodiment, the fluidic pathway is configurable for any one or more of, for example communicating a cleaning fluid to the first foodstuff treatment module via the delivery section and the first supply section while the first foodstuff treatment module is in fluidic isolation from the return section; and communicating the cleaning fluid to the first foodstuff treatment module via the delivery section and the first supply section while the first foodstuff treatment module is in fluidic communication with the return section. By communicating the cleaning fluid to the fluidic pathway in this way, the fluidic pathway is cleaned in place, thereby reducing incidence of bacterial infection.

A typical clean-in-place routine can include flowing a solution having a temperature of about 110° C. to about 120° C. or greater at a flow rate of about 5 ft/s to about 10 ft/s through a fluidic pathway. In certain examples, a pH of the solution is greater than about 12 or less than about 3.

Figure 6A:
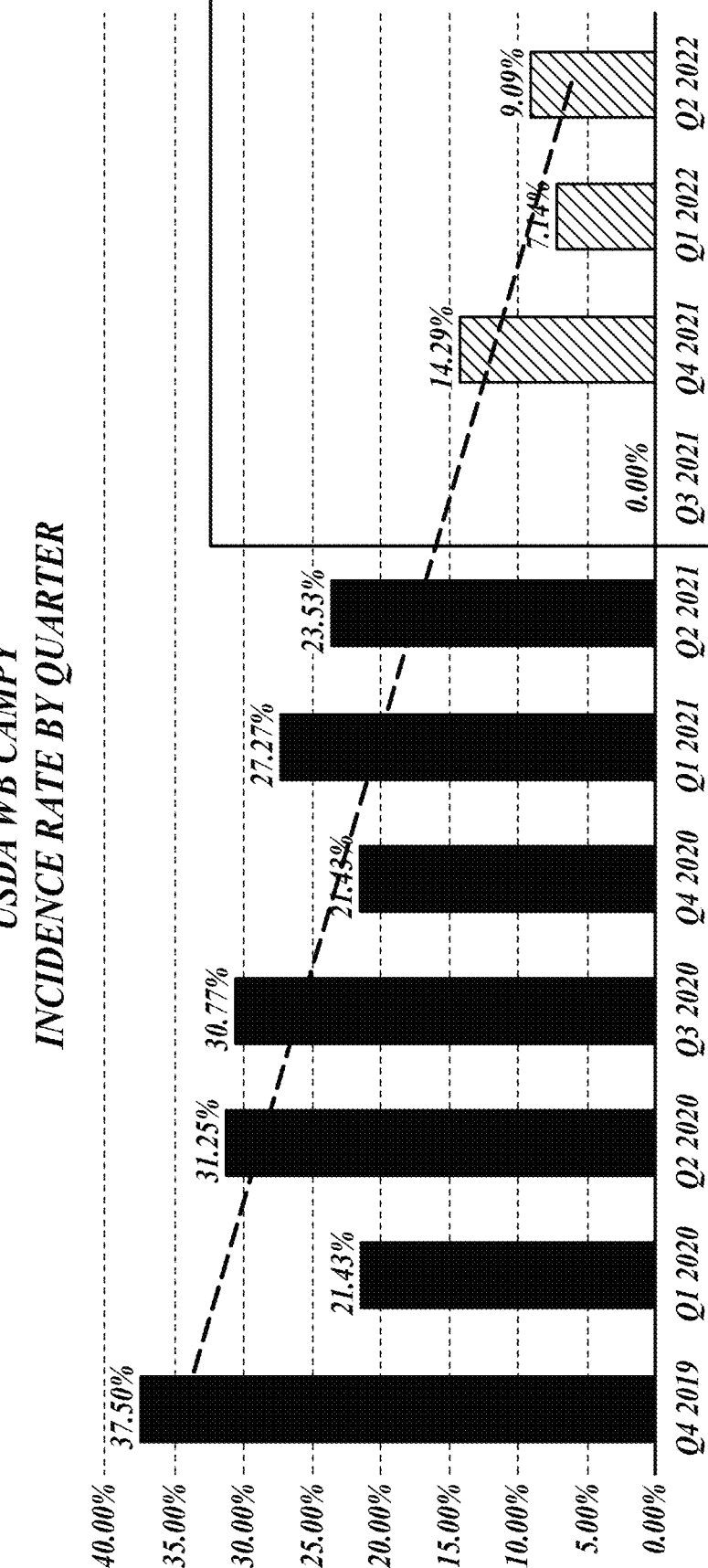
FIG. 6A graphically illustrates quarterly *Campylobacter* incidence using a conventional system and a system according to an embodiment of the present disclosure (inset)
Figure 6B:
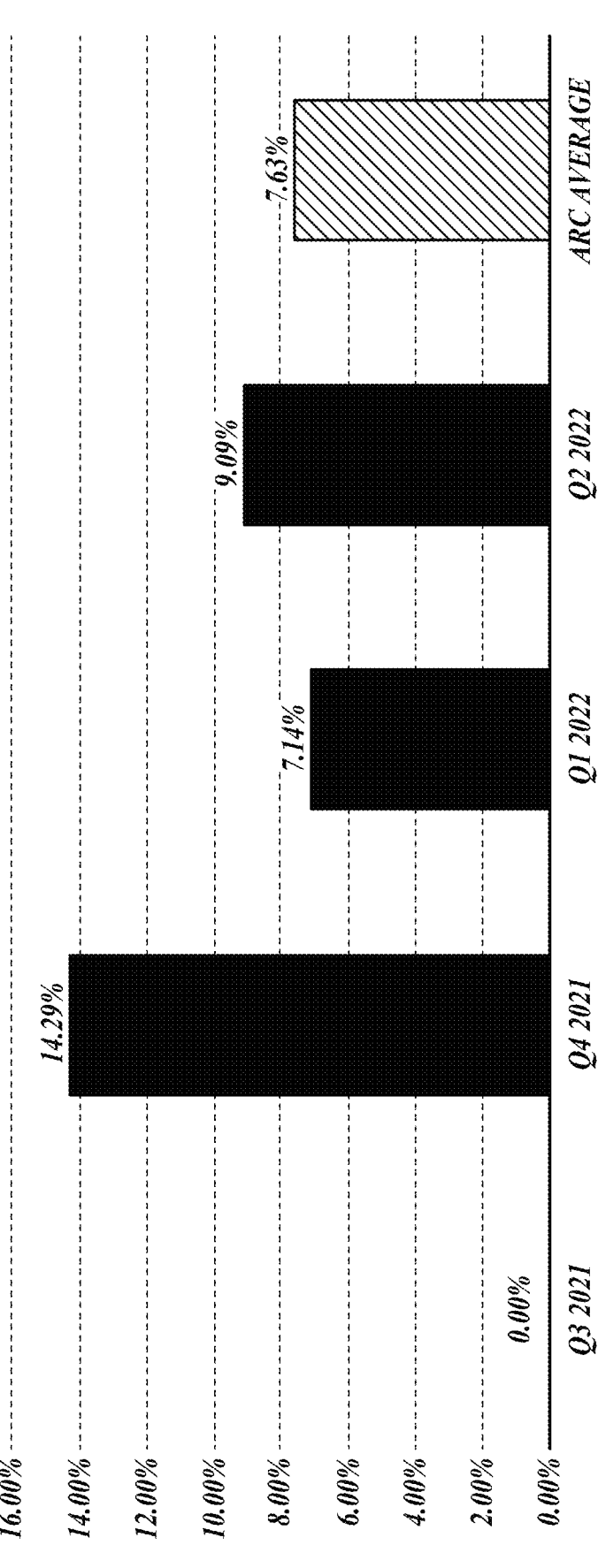
FIG. 6B graphically illustrates the *Campylobacter* incidence from the inset portion of FIG. 6A using the system according to an embodiment of the present disclosure.

FIG. 6A graphically illustrates quarterly *Campylobacter* incidence using a conventional system and a system according to an embodiment of the present disclosure (inset). FIG. 6B graphically illustrates the *Campylobacter* incidence from the inset portion of FIG. 6A using the system according to an embodiment of the present disclosure, providing an average for these quarters illustrated as ARC AVERAGE. As shown, with implementation of the systems and methods according to embodiments of the present disclosure, incidence rates of *Campylobacter* infection are reduced significantly. See also FIG. 9.

Figure 8A:
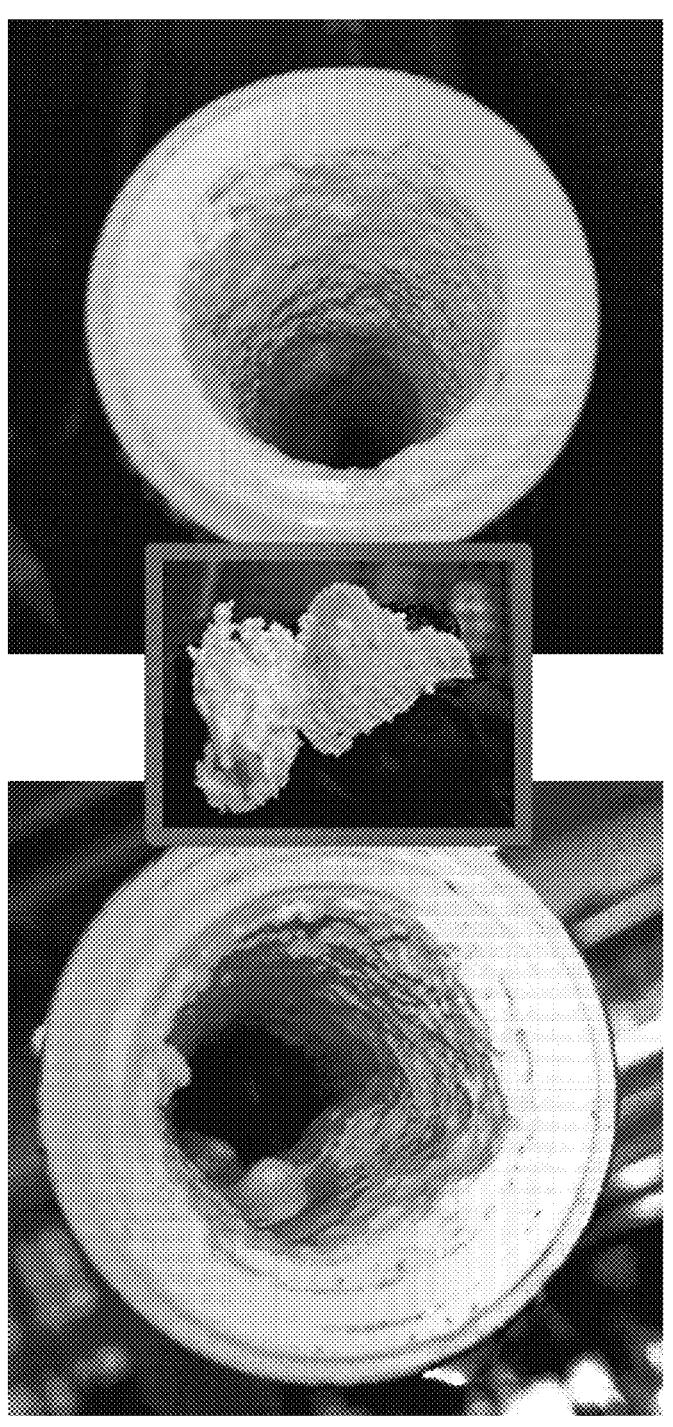
FIG. 8A provides images of (top) an inside portion of a pipe used in a system according to an embodiment of the present disclosure, (middle) an image of biofilm buildup flaked from a pipe from a conventional system, and (bottom) an inside portion of a pipe from a conventional system.
Figure 8B:
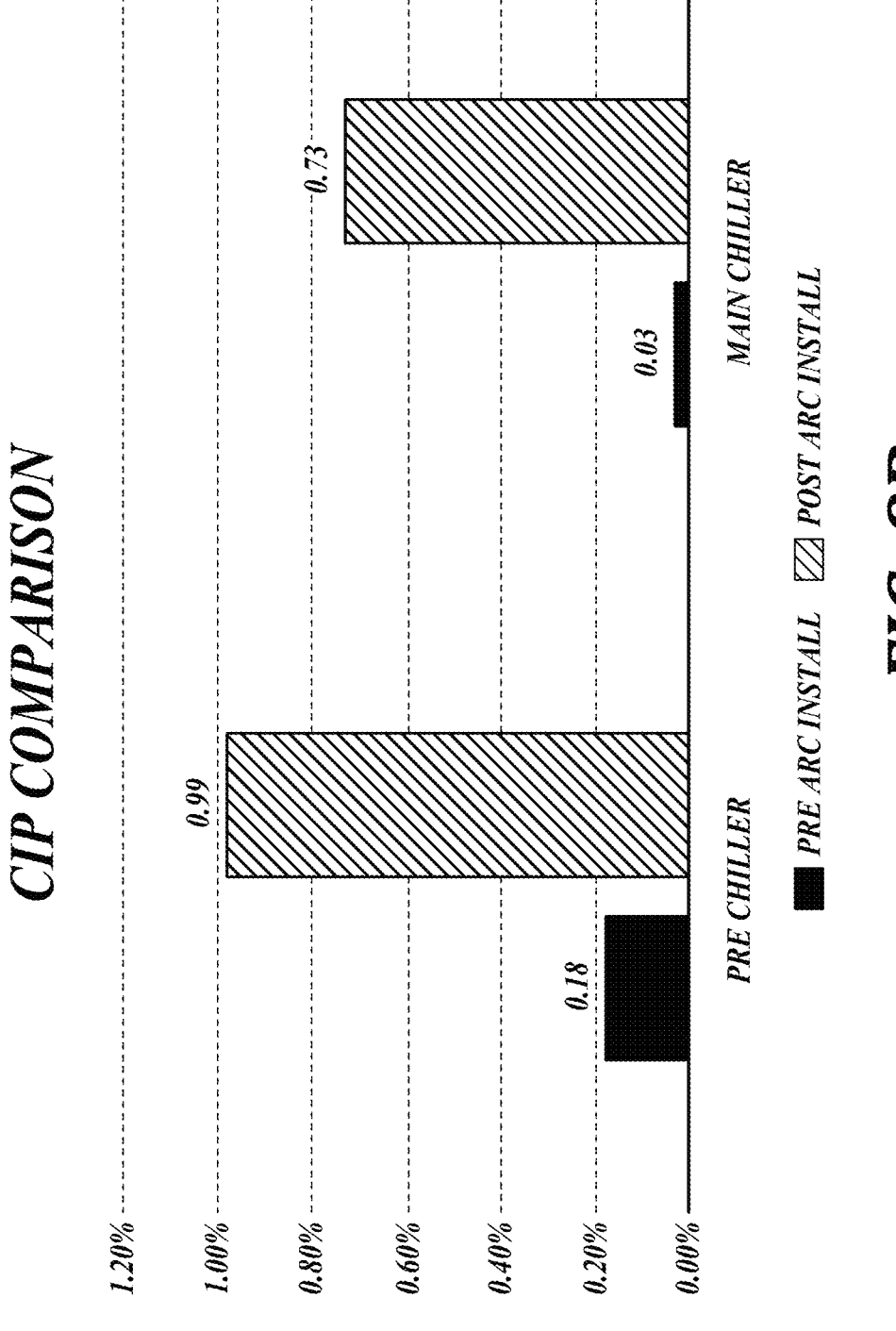
FIG. 8B graphically illustrates a log reduction of bacteria in a pre-chiller (left) and in a main chiller (right) using a conventional system and a system according to an embodiment of the present disclosure.

Similarly, the systems and methods are shown to provide greater reduction in bacterial numbers compared to conventional systems and methods. FIG. 8B graphically illustrates a log reduction of bacteria in a pre-chiller (left) and in a main chiller using a conventional system and a system according to an embodiment of the present disclosure. As shown, the systems and methods according to embodiments of the present disclosure (illustrated as POST ARC INSTALL) provide a much greater log reduction of bacterial numbers (0.99 and 0.73) than conventional systems and methods (0.18 and 0.03), which are illustrated as PRE ARC INSTALL.

One mechanism for reducing the incidence rates of bacterial infection is through reduction of biofilm buildup in the fluidic pathways of the systems according to embodiments of the present disclosure. FIG. 8A provides images of (top) an inside portion of a pipe used in a system according to an embodiment of the present disclosure, (middle) an image of biofilm buildup flaked from a pipe from a conventional system, and (bottom) an inside portion of a pipe from a conventional system. It is believed that biofilm containing bacteria can flake off of pipe walls (see FIG. 8A, middle) and flow into other portions of the system and infect such portions with bacteria. As shown in FIG. 8A, biofilm buildup in pipes of systems according to the present disclosure (see FIG. 8A (top)) are much thinner than those in pipes of conventional systems (see FIG. 8A (bottom)).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The embodiments of the invention in which an exclusive property or privilege is claimed are defined as follows:

1. A method, comprising operating a system, wherein operating the system comprises one or more of:

(State 1) communicating a foodstuff disinfecting fluid to a first foodstuff treatment module via a delivery section and a first supply section while the first foodstuff treatment module is in fluidic isolation from a return section;

(State 2) communicating a cleaning fluid to the first foodstuff treatment module via the delivery section and the first supply section while the first foodstuff treatment module is in fluidic isolation from the return section; and (State 3) communicating the cleaning fluid to the first foodstuff treatment module via the delivery section and the first supply section while the first foodstuff treatment module is in fluidic communication with the return section, wherein the operating effects treatment, with the foodstuff treatment fluid, of a foodstuff disposed in the first foodstuff treatment module.

2. The method of claim 1, wherein the operating effects cleaning, with the cleaning fluid, of the delivery section, the first supply section, the first foodstuff treatment module, and the return section.

3. The method of claim 1, wherein the operating of the system is based on a signal received from a user interface, and wherein the signal is based on an input from a user.

4. The method of claim 1, further comprising converting the system between any one of State 1, State 2, and State 3 and any other one of State 1, State 2, and State 3.

5. A method, comprising:

(State 1) communicating a foodstuff treatment fluid via a fluidic pathway to a first foodstuff treatment module so as to disinfect a foodstuff disposed within the first foodstuff treatment module; and at least one of:

(State 2a) communicating, via a first portion of the fluidic pathway, a cleaning fluid to the first foodstuff module so as to disinfect the first portion of the fluidic pathway and the first foodstuff module, and (State 2b) communicating, via the first portion of the fluidic pathway, the cleaning fluid to a second portion of the fluidic pathway that at least partially forms a loop with the first portion of the fluidic pathway, the communicating disinfecting the first portion of the fluidic pathway and the second portion of the fluidic pathway.

6. The method of claim 5, further comprising communicating the foodstuff treatment fluid via the fluidic pathway to a second foodstuff treatment module so as to disinfect a foodstuff disposed within the second foodstuff treatment module.

7. The method of claim 6, further comprising communicating, via the first portion of the fluidic pathway, the cleaning fluid to the second foodstuff module so as to disinfect the first portion of the fluidic pathway and the second foodstuff module.

8. The method of claim 7, wherein the cleaning fluid is communicated simultaneously to the first foodstuff treatment module and the second foodstuff treatment module.

9. A method comprising operating a system, wherein operating the system comprises one or more of:

(State 1) communicating a foodstuff disinfecting fluid to a first foodstuff treatment module via a delivery section and a first supply section while the first foodstuff treatment module is in fluidic isolation from a return section;

(State 2) communicating a cleaning fluid to the first foodstuff treatment module via the delivery section and the first supply section while the first foodstuff treatment module is in fluidic isolation from the return section; and (State 3) communicating the cleaning fluid to the first foodstuff treatment module via the delivery section and the first supply section while the first foodstuff treatment module is in fluidic communication with the return section, wherein the operating of the system is based on a signal received from a user interface, and wherein the signal is based on an input from a user.

10. The method of claim 9, wherein the operating effects treatment, with the foodstuff treatment fluid, of a foodstuff disposed in the first foodstuff treatment module.

11. The method of claim 9, wherein the operating effects cleaning, with the cleaning fluid, of the delivery section, the first supply section, the first foodstuff treatment module, and the return section.

12. The method of claim 9 further comprising converting the system according to claim 10 between any one of State 1, State 2, and State 3 and any other one of State 1, State 2, and State 3.

13. A method, comprising operating a system, wherein operating the system comprises one or more of:

(State 1) communicating a foodstuff disinfecting fluid to a first foodstuff treatment module via a delivery section and a first supply section while the first foodstuff treatment module is in fluidic isolation from a return section;

(State 2) communicating a cleaning fluid to the first foodstuff treatment module via the delivery section and the first supply section while the first foodstuff treatment module is in fluidic isolation from the return section; and (State 3) communicating the cleaning fluid to the first foodstuff treatment module via the delivery section and the first supply section while the first foodstuff treatment module is in fluidic communication with the return section; and converting the system between any one of State 1, State 2, and State 3 and any other one of State 1, State 2, and State 3.

14. The method of claim 13, wherein the operating effects treatment, with the foodstuff treatment fluid, of a foodstuff disposed in the first foodstuff treatment module.

15. The method of claim 13, wherein the operating effects cleaning, with the cleaning fluid, of the delivery section, the first supply section, the first foodstuff treatment module, and the return section.

16. The method of claim 13, wherein the operating of the system is based on a signal received from a user interface, and wherein the signal is based on an input from a user.

17. The method of claim 13, further comprising communicating the foodstuff treatment fluid via the fluidic pathway to a second foodstuff treatment module so as to disinfect a foodstuff disposed within the second foodstuff treatment module.

18. The method of claim 17, further comprising communicating, via the first portion of the fluidic pathway, the cleaning fluid to the second foodstuff module so as to disinfect the first portion of the fluidic pathway and the second foodstuff module.

19. The method of claim 18, wherein the cleaning fluid is communicated simultaneously to the first foodstuff treatment module and the second foodstuff treatment module.

* * * * *